US008224974B1

(12) United States Patent
Flora et al.

(10) Patent No.: US 8,224,974 B1
(45) Date of Patent: Jul. 17, 2012

(54) METHOD AND APPARATUS FOR DOWNLOADING INFORMATION

(75) Inventors: John R. Flora, Pleasanton, CA (US); Glynis Hively, San Jose, CA (US); David R. Larsen, San Jose, CA (US); Nicholas A. Mooney, San Jose, CA (US); Sandeep Sagar, Santa Clara, CA (US); J W M Spies, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 753 days.

(21) Appl. No.: 11/699,818

(22) Filed: Jan. 29, 2007

(51) Int. Cl.
*G06F 15/16* (2006.01)
(52) U.S. Cl. .................................. 709/228; 709/216
(58) Field of Classification Search .................. 709/228, 709/231
See application file for complete search history.

(56) References Cited

U.S. PATENT DOCUMENTS

| 5,535,334 | A | * | 7/1996 | Merkley et al. ............... 709/239 |
| 5,765,144 | A | * | 6/1998 | Larche et al. .................... 705/38 |
| 5,794,230 | A | * | 8/1998 | Horadan et al. .................. 707/2 |
| 6,009,431 | A | * | 12/1999 | Anger et al. ................... 707/741 |
| 6,128,602 | A | * | 10/2000 | Northington et al. ........... 705/35 |
| 6,223,272 | B1 | * | 4/2001 | Coehlo et al. ...................... 712/1 |
| 6,477,581 | B1 | * | 11/2002 | Carpenter et al. ............. 709/238 |
| 6,697,787 | B1 | * | 2/2004 | Miller ............................. 705/31 |
| 6,839,686 | B1 | * | 1/2005 | Galant ......................... 705/36 R |
| 6,985,945 | B2 | * | 1/2006 | Farhat et al. .................. 709/224 |
| 7,222,342 | B2 | * | 5/2007 | Hata et al. ..................... 717/173 |
| 7,483,958 | B1 | * | 1/2009 | Elabbady et al. ............. 709/217 |
| 7,853,609 | B2 | * | 12/2010 | Dehghan et al. .............. 707/778 |
| 2003/0144903 | A1 | * | 7/2003 | Brechner et al. ................ 705/14 |
| 2005/0044166 | A1 | * | 2/2005 | Colville et al. ............... 709/215 |
| 2006/0135179 | A1 | * | 6/2006 | Aaltonen ................... 455/456.3 |
| 2007/0106759 | A1 | * | 5/2007 | Willie et al. .................. 709/219 |
| 2007/0204115 | A1 | * | 8/2007 | Abramson ..................... 711/154 |
| 2008/0098300 | A1 | * | 4/2008 | Corrales et al. ............... 715/243 |
| 2009/0006599 | A1 | * | 1/2009 | Brownrigg, Jr. ............. 709/223 |
| 2009/0092083 | A1 | * | 4/2009 | Shagdar et al. ............... 370/328 |

* cited by examiner

*Primary Examiner* — Bunjob Jaroenchonwanit
(74) *Attorney, Agent, or Firm* — Park, Vaughan, Fleming & Dowler LLP; Anthony P. Jones

(57) ABSTRACT

Embodiments of the present invention provide a system that configures a download technique. The system starts by determining a priority order for a set of download techniques. The system then attempts to download information from an institution using download techniques from the set of download techniques. While attempting to download information, the system attempts the download techniques in priority order. If information is downloaded using a given download technique, the system records the given download technique and uses the given download technique to perform subsequent downloads.

18 Claims, 3 Drawing Sheets

METHOD AND APPARATUS FOR DOWNLOADING INFORMATION

BACKGROUND

Related Art

Some financial management software applications have the ability to download information from several sources, including banks, investment firms, accounting firms, tax preparation firms, healthcare institutions, data aggregators, and other sources. These financial management applications can then sort and compile the information into an easy-to-use format, thereby saving the user from having to manually enter and sort the information from each source.

Some institutions are beginning to use web service applications to provide similar services to their clients. For example, the institutions can provide "one-stop" information management websites (which can include embedded financial management features). Users can configure these websites to download, compile, and present information from several sources, including banks, investment firms, tax preparation firms, data aggregators, healthcare institutions, and other institutions. Such websites provide the user with a web-based interface for performing tasks such as: tax preparation, tracking bills, budgeting, monitoring account activity, or investing.

Unfortunately, many users do not configure these types of applications to use the most effective format for downloading information. Hence, users often manually enter information that these applications could download automatically. Alternatively, these applications may be automatically performing the downloading operation, but in doing so may not use the most effective download technique.

SUMMARY

Embodiments of the present invention provide a system that automatically configures a download technique. The system starts by determining a priority order for a set of download techniques. The system then attempts to download information from an institution using download techniques from the set of download techniques. While attempting to download information, the system attempts the download techniques in priority order. If information is downloaded using a given download technique, the system records the given download technique and uses the given download technique to perform subsequent downloads.

In one embodiment, prior to attempting to download information, the system detects an attempt to download information using a download technique. The system then determines if a download technique that is higher-priority than the download technique is available in the set of download techniques. If so, the system prompts the user to update the download technique. Upon receiving consent from the user to the update of the download technique, the system configures the download technique by performing the attempting and recording operations.

In one embodiment, determining the priority order involves reading the set of download techniques available for the institution from a download-techniques file, wherein the download-techniques file indicates the priority order for the download techniques.

In one embodiment, the system downloads the download-techniques file from a remote computer that stores a copy of the download-techniques file.

In one embodiment, the set of download techniques includes: (1) a direct connect technique, wherein information is acquired from a computer at the institution; (2) a web connect technique, wherein information is gathered from fields on a web page hosted by a computer at the institution; (3) a file download technique, wherein information is gathered from a file received from a user; and (4) a manual entry technique, wherein information is gathered from information entered by the user.

In one embodiment, the system receives a username and a password that are used to perform the download.

In one embodiment, the institution is one of: (1) a financial institution; (2) a healthcare provider; (3) an insurance company; (4) a retail or wholesale establishment; (5) a data aggregator; or (6) another commercial or non-commercial operation that provides electronic access to financial information, account information, personal records, or other types of information.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Computer System

Figure 1:
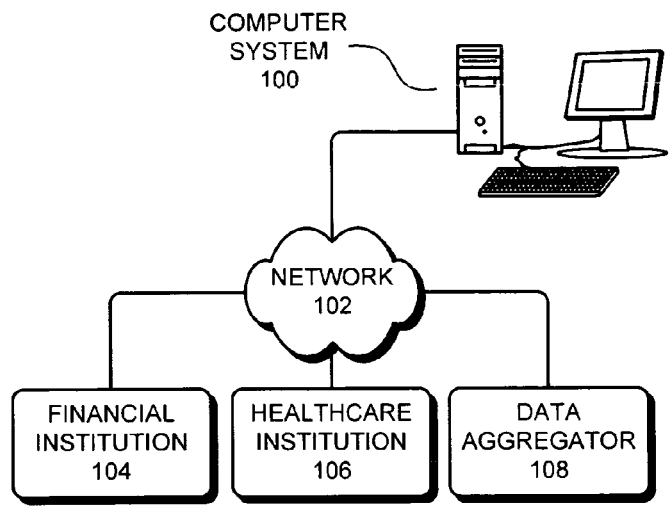
FIG. 1 illustrates a computer system which is coupled through network to a group of exemplary institutions in accordance with an embodiment of the present invention.

FIG. 1 illustrates a computer system 100 that is coupled through network 102 to a group of institutions, including financial institution 104, healthcare institution 106, and data aggregator 108 in accordance with an embodiment of the present invention. Note that computer system 100 is pictured as a desktop computer system for the purposes of illustration, but in alternative embodiments, computer system 100 can be any type of computer system, such as a computer system based on a microprocessor, a mainframe computer, a web server, a portable computing device, or a personal digital assistant (PDA).

Financial institution 104, healthcare institution 106, and data aggregator 108 provide customers with electronic access to information, such as financial information, account information, personal records, or other types of information. For example, financial institution 104 can be a bank, an investment firm, an accounting firm, a tax preparation firm, an insurance firm, a retirement planning firm, or another financial institution that provides electronic access to financial information and other information. Healthcare institution 106 can be a hospital, a HMO, an insurer, or another healthcare firm that provides electronic access to financial information and other healthcare-related information. Data aggregator 108 can be a data broker or another type of firm that provides electronic access to data collected from a variety of sources. In other embodiments of the present invention, computer system 100 can be coupled through network 102 to retail operations, credit card institutions, utility providers, phone service providers, and other commercial and non-commercial operations that provide electronic access to financial information, account information, personal records, or other types of information. In some embodiments of the present invention, electronic access includes access via a network such as the Internet, a WAN, a LAN, a combination of network types, or other suitable network. In embodiments of the present invention, electronic access includes access using one or more of a file transfer protocol (FTP), a Telnet connection, a virtual private network connection (VPN), and other electronic access protocols now in existence or later developed.

In one embodiment of the present invention, computer system 100 is running a financial management software application, such as Quicken™, QuickBooks™, Money™, Small Business Accounting™, PeachTree™, Gnucash™, or any other application that facilitates the management of finances. In this embodiment, a user uses the financial management software application to manage personal finances, and in doing so performs operations such as creating a budget, tracking expense categories, or paying bills.

In an alternative embodiment, computer system 100 is a web server at an institution which is running a web service application. For example, the web service application can provide customers with electronic access to information, such as financial information, account information, personal records, or other types of information. In embodiments of the present invention, the web service application includes financial management features. Although the web service application is provided by the institution, the customers of the institution can configure the web service application to collect information for the user from other institutions. When configured in this way, the institution's web service application provides the institution's customers with a "one-stop" web-based interface for accessing financial information, account information, personal records, or other types of information. Note that for the purposes of illustration, we refer to both the financial management software application and the web service application as "information management applications." Furthermore, the terminology "institution" as used herein includes not only the original entity that generates the data, but also any third-party entity that provides web-hosting, data storage, online application, or other forms of electronic business services for the original entity. For example, computer system 100 can communicate with a data center operated by a third-party service provider on behalf of a bank or a healthcare institution via network 102. In general, an "institution" can be any commercial or non-commercial operation that provides electronic access to financial information, account information, personal records, or other types of information.

Figure 2:
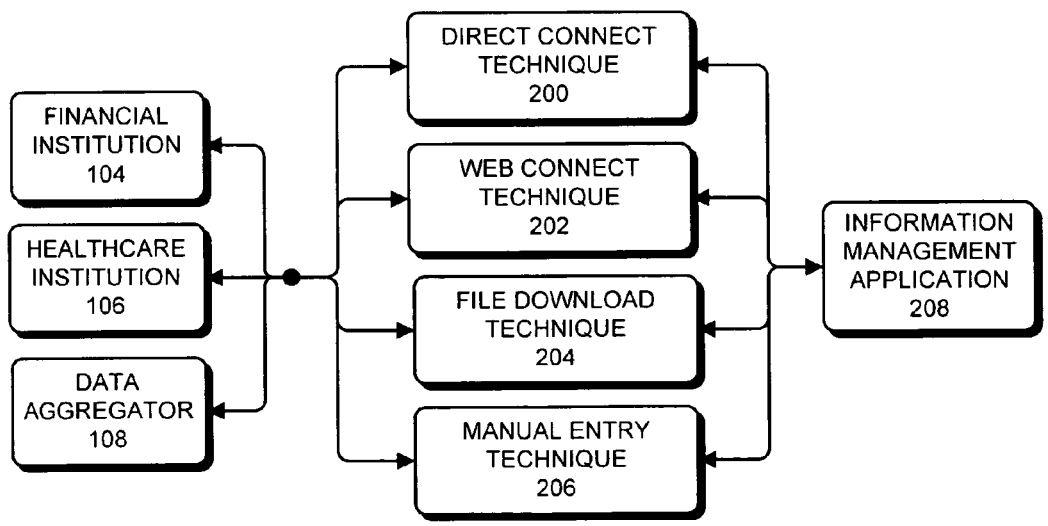
FIG. 2 illustrates a number of techniques for collecting information in accordance with an embodiment of the present invention.

FIG. 2 illustrates a number of techniques for collecting information from institutions 104-108 in accordance with an embodiment of the present invention. As shown in FIG. 2, information management application 208 can: (1) use a direct connect technique 200, wherein information is acquired from a computer at the institution; (2) use a web connect technique 202, wherein information is gathered from fields on a user account web page hosted by a computer at the institution and imported into information management application 208; (3) use a file download technique 204, wherein a user downloads a file containing information from a user account web page hosted by a computer at the institution and imports the file into information management application 208; and (4) use a manual entry technique 206, wherein a user enters information into information management application 208 without downloading information from the institution.

Although information can be collected using each of the above-mentioned techniques, the direct connect technique 200 is most likely to provide accurate and up-to date data, while the manual entry technique 206 is least likely to provide accurate and up-to date data (because user entry is more error-prone). Hence, embodiments of the present invention rank these techniques in "priority" from highest (i.e., most desirable to use) to lowest (i.e., least desirable to use), such that direct connect technique 200 is the highest priority.

During operation, information management application 208 may use the priority ranking to configure downloads to use the highest-priority download technique available for a given institution. In embodiments of the present invention, information management application 208 performs a "desktop connection migration" to configure or reconfigure the download technique. In embodiments of the present invention, information management application 208 performs a "smart download" when determining a download technique. The desktop connection migration and the smart download are described in detail below. Note that although FIG. 2 illustrates financial institution 104, healthcare institution 106, and data aggregator 108, other third-party service providers operating on behalf of these entities can also be the data source. Such service providers include, but are not limited to, web-hosting service providers, data-storage service providers, and electronic business centers.

Smart Download

Figure 3:
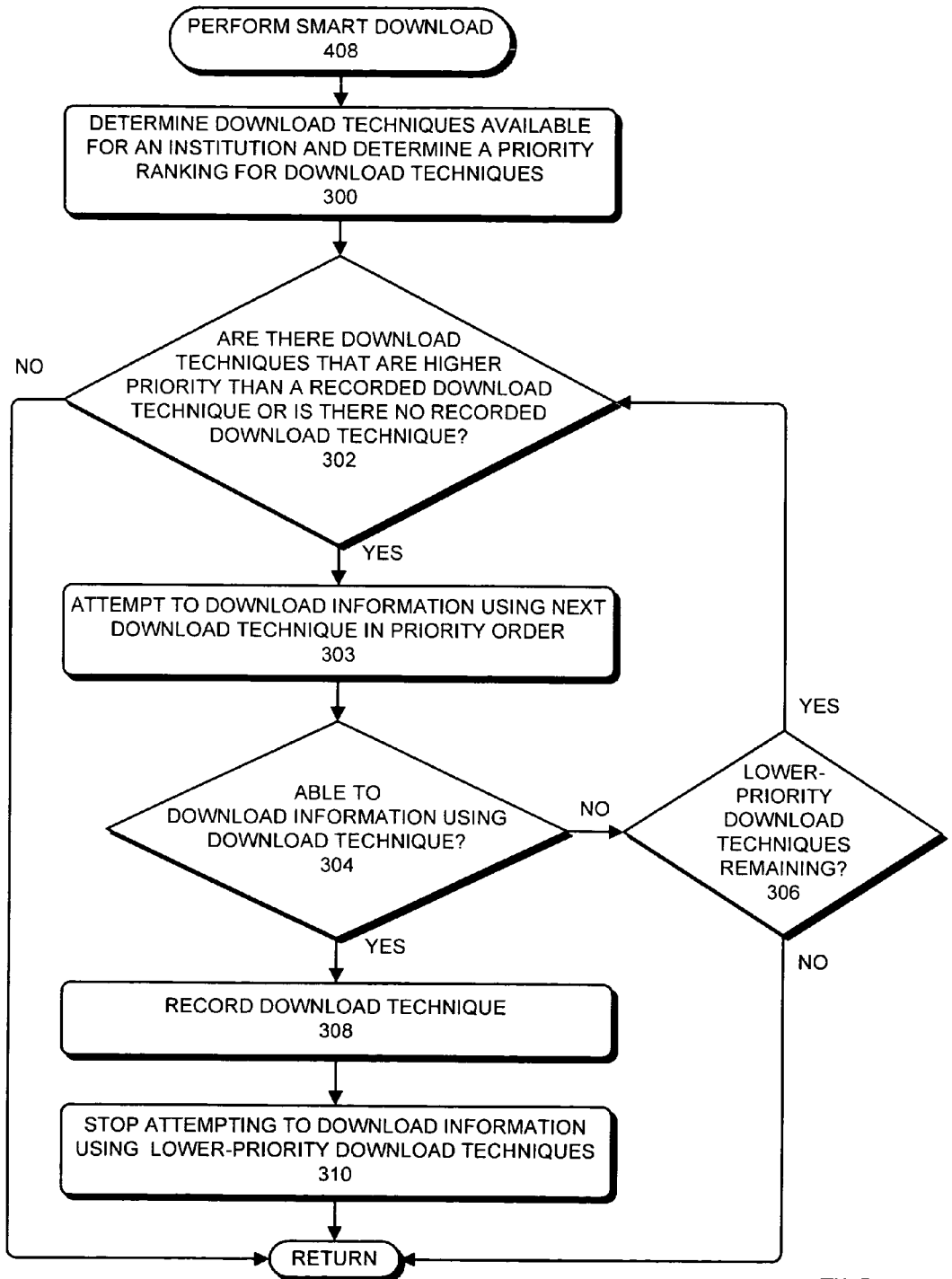
FIG. 3 presents a flowchart illustrating a smart download in accordance with an embodiment of the present invention.

FIG. 3 presents a flowchart illustrating a smart download in accordance with an embodiment of the present invention. During the smart download, information management application 208 (see FIG. 2) determines a download technique to be used for subsequent downloads of information from a given institution.

The smart download starts with information management application 208 determining the download techniques available for an institution and determining a priority ranking for these download techniques (step 300). In embodiments of the present invention, information management application 208 reads a download-technique file stored in computer system 100 to determine the available download techniques for the institution and the priority for these download techniques. In this embodiment, the download-technique file contains a listing for each of a number of institutions and the corresponding download techniques available for each institution with an indication of priority order.

In further embodiments, information management application 208 downloads the download-technique file from a computer remote from computer system 100. For example, the download-technique file can be downloaded from the company that provides information management application 208, the institution, a website, a remote database, or another entity. In this embodiment, the remote computer maintains a download-technique file that contains a listing for each of a number of institutions and the corresponding download techniques available for each institution along with an indication of priority order. Information within the download-technique file is updated as institutions and download techniques are made available.

In further embodiments, information management application 208 determines the available download techniques for a given institution using a list which contains only the download techniques available for the given institution with an indication of priority order. In this embodiment, the list can be downloaded from the institution, the company that provides information management application 208, a website, a remote database, or another entity when information management application 208 requests it.

Information management application 208 then determines whether any available download technique is higher priority than the recorded download technique or whether there is no recorded download technique (step 302). If not, the process ends. Otherwise, information management application 208 attempts to download information using the next download technique in priority order (step 303).

Attempting to use the download technique can require information management application 208 to provide a username and password to the institution. In embodiments of the present invention, information management application 208 gets the username and password from the user during a desktop connection migration (see FIG. 4). In other embodiments, information management application 208 gets the usernames and passwords from the user during the smart download.

If information management application 208 is unable to download the information using the download technique (step 304), information management application determines if there are lower priority download techniques remaining (step 306) in the priority list that have not been attempted. If not, the configuration of a download technique was unsuccessful and the process ends. However, if there are lower priority download techniques remaining, information management application 208 returns to step 302 to determine whether the next download technique in priority order is higher priority than a recorded download technique or whether there is no recorded download technique.

On the other hand, if information management application 208 is able to download information using the download technique (step 304), information management application 208 records the download technique (step 308). For example, if a download using direct connect technique 200 is completed successfully, information management application 208 records direct connect technique 200 for the financial institution. Subsequent downloads from the institution are then completed using direct connect technique 200.

When a download technique has been recorded, information management application 208 does not attempt to download information using any available lower-priority download techniques (step 310) and the process ends.

Desktop Connection Migration

Figure 4:
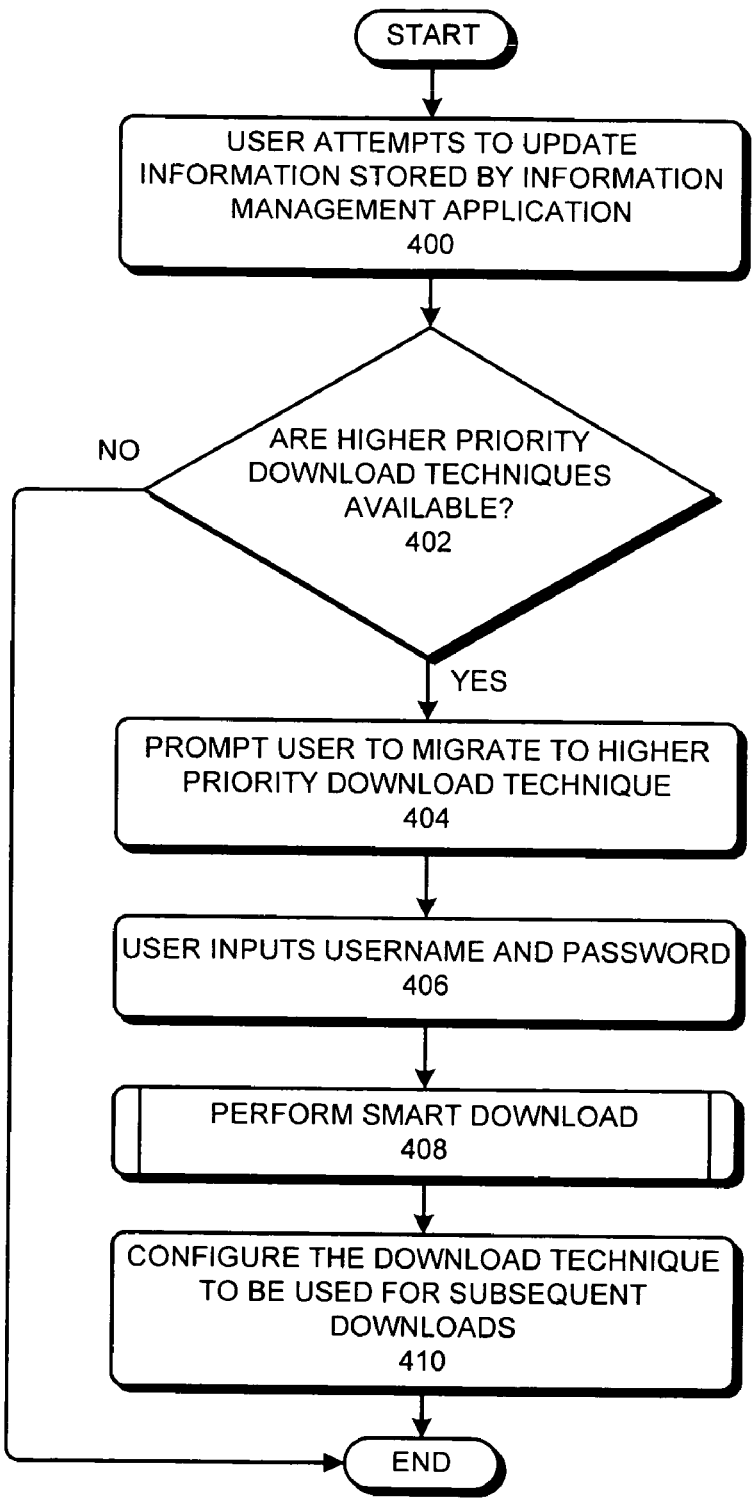
FIG. 4 presents a flowchart illustrating desktop connection migration in accordance with an embodiment of the present invention.

FIG. 4 presents a flowchart illustrating a desktop connection migration in accordance with an embodiment of the present invention. During the desktop connection migration, information management application 208 configures or reconfigures the download technique as described below.

The process starts when a user attempts to update the information stored by information management application 208 (step 400) using one of the available download techniques. For example, the user may use manual entry technique 206 to enter information into information management application 208 (see FIG. 2). Alternatively, the user may command information management application 208 to download information using web connect technique 202.

Information management application 208 detects the attempted update of the information and determines if there are one or more higher-priority download techniques available (step 402) (i.e., if there are download techniques that are higher priority than the technique that the user attempting to use.) Note that determining if there are one or more higher-priority download techniques available involves determining a priority order for the download techniques. Determining a priority order for the download techniques during the desktop connection migration is handled in a similar fashion to the download technique priority determination during the smart download (see FIG. 3). If there are no higher priority download techniques available, the process ends.

Otherwise, information management application 208 prompts the user to migrate to a higher priority download technique (step 404). If the user consents, information management application 208 prompts the user to enter a username or password (step 406) for the higher-priority download techniques that require a username and password.

When the user has provided any necessary usernames and passwords, information management application 208 performs a smart download (step 408). (The smart download is explained in more detail with reference to FIG. 3.) If the smart download is successful, information management application 208 configures the download technique to be used for subsequent downloads (step 410) of information from the institution.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method comprising:
   determining a subset of download techniques for downloading financial data associated with a respective institution to an application on a computer;
   determining, by the computer, a priority order for the subset of download techniques based on a plurality of institutions, their corresponding subsets of available download techniques, and indications of priority order for the download techniques within the subsets;
   detecting an attempt to download the financial data using a download technique;
   determining that a download technique that is higher-priority than the download technique is available in the subset of download techniques;
   prompting the user to update the download technique;
   upon receiving consent from the user to the update of the download technique, configuring the download technique by performing the attempting and recording operations;
   attempting to download the financial data from the institution using a download technique from the subset of download techniques;
   responsive to the attempt to download the financial data being unsuccessful, attempting to download the financial data from the institution using a different download technique in the subset, which is ranked lower than the download technique in the subset according to the priority order; and responsive to the attempt to download the financial data being successful, recording the download technique as a used download technique.

2. The method of claim 1, further comprising reading the subset of download techniques available for the institution from a download-techniques file, wherein the download-techniques file indicates the priority order for the download techniques.

3. The method of claim 2, wherein the method further comprises downloading the download-techniques file from a remote computer that stores a copy of the download-techniques file.

4. The method of claim 1, wherein the subset of download techniques includes:
   a first technique, wherein the financial data is acquired from a computer at the institution,
   a second technique, wherein the financial data is gathered from fields on a web page hosted by a computer at the institution, and
   a third technique, wherein the financial data is gathered from a file received from a user.

5. The method of claim 1, wherein the method further comprises receiving a username and a password that are used to perform the download.

6. The method of claim 1, wherein the institution is one of:
   a financial institution;
   a healthcare provider;
   an insurance company;
   a retail or wholesale establishment;
   a financial data aggregator; or
   another commercial or non-commercial operation that provides electronic access to financial information, account information, personal records, or other types of information.

7. A non-transitory computer-readable storage medium storing instructions that when executed by a computer cause the computer to perform a method comprising:
   determining a subset of download techniques for downloading financial data associated with a respective institution to an application on a computer;
   determining, by the computer, a priority order for the subset of download techniques based on a plurality of institutions, their corresponding subsets of available download techniques, and indications of priority order for the download techniques within the subsets;
   detecting an attempt to download the financial data using a download technique;
   determining that a download technique that is higher-priority than the download technique is available in the subset of download techniques;
   prompting the user to update the download technique;
   upon receiving consent from the user to the update of the download technique, configuring the download technique by performing the attempting and recording operations;
   attempting to download the financial data from the institution using a download technique from the subset of download techniques;
   responsive to the attempt to download the financial data being unsuccessful, attempting to download the financial data from the institution using a different download technique in the subset, which is ranked lower than the download technique in the subset according to the priority order; and
   responsive to the attempt to download the financial data being successful, recording the download technique as a used download technique.

8. The computer-readable storage medium of claim 7, the method further comprising reading the subset of download techniques available for the institution from a download-techniques file, wherein the download-techniques file indicates the priority order for the download techniques.

9. The computer-readable storage medium of claim 8, wherein the method further comprises downloading the download-techniques file from a remote computer that stores a copy of the download-techniques file.

10. The non-transitory computer-readable storage medium of claim 7, wherein the subset of download techniques includes:
    a first technique, wherein the financial data is acquired from a computer at the institution,
    a second technique, wherein the financial data is gathered from fields on a web page hosted by a computer at the institution, and
    a third technique, wherein the financial data is gathered from a file received from a user.

11. The computer-readable storage medium of claim 7, wherein the method further comprises receiving a username and a password that are used to perform the download.

12. The computer-readable storage medium of claim 7, wherein the institution is one of:
    a financial institution;
    a healthcare provider;
    an insurance company;
    a retail or wholesale establishment;
    a financial data aggregator; or
    another commercial or non-commercial operation that provides electronic access to financial information, account information, personal records, or other types of information.

13. An apparatus comprising:
    a processor;
    a download-technique-determining mechanism configured to determine a subset of download techniques for downloading financial data associated with a respective institution to an application on a computer;
    a priority-order-determining mechanism configured to determine a priority order for the subset of download techniques based on a plurality of institutions, their corresponding subsets of available download techniques, and indications of priority order for the download techniques within the subsets;
    an execution mechanism configured to:
        detect an attempt to download the financial data using a download technique;
        determine that a download technique that is higher-priority than the download technique is available in the subset of download techniques;
        prompt the user to update the download technique; and
        upon receiving consent from the user to the update of the download technique, the execution mechanism is configured to configure the download technique by performing the attempting and recording operations;
    a download-attempting mechanism configured to attempt to download the financial data from the institution using a download technique from the subset of download techniques;
    a different-downloading-mechanism, responsive to the attempt to download the financial data being unsuccessful, configured to attempt to download the financial data from the institution using a different download technique in the subset, which is ranked lower than the download technique in the subset according to the priority order; and a download-recording mechanism configured to record the download technique as a used download technique.

14. The apparatus of claim 13, wherein the execution mechanism is further configured to read the subset of download techniques available for the institution from a download-techniques file, wherein the download-techniques file indicates the priority order for the download techniques.

15. The apparatus of claim 14, wherein the execution mechanism is configured to download the download-techniques file from a remote computer that stores a copy of the download-techniques file.

16. The apparatus of claim 13, wherein the subset of download techniques includes:
 a first technique, wherein the financial data is acquired from a computer at the institution,
 a second technique, wherein the financial data is gathered from fields on a web page hosted by a computer at the institution, and
 a third technique, wherein the financial data is gathered from a file received from a user.

17. The apparatus of claim 13, wherein the execution mechanism is configured to receive a username and a password that are used to perform the download.

18. The apparatus of claim 13, wherein the institution is one of:
 a financial institution;
 a healthcare provider;
 an insurance company;
 a retail or wholesale establishment;
 a financial data aggregator; or
 another commercial or non-commercial operation that provides electronic access to financial information, account information, personal records, or other types of information.

\* \* \* \* \*